US011472498B2

(12) United States Patent
Abdellatif et al.

(10) Patent No.: US 11,472,498 B2
(45) Date of Patent: *Oct. 18, 2022

(54) PERCHING UAV WITH RELEASABLE CRAWLER

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Fadl Abdellatif, Thuwal (SA); Jeff S. Shamma, Thuwal (SA)

(73) Assignees: Saudi Arabian Oil Company, Dhahran (SA); King Abdullah University Of Science And Technology, Thuwal (SA)

(*) Notice: Subject to any disclaimer, the term of this patent is extended or adjusted under 35 U.S.C. 154(b) by 468 days.

This patent is subject to a terminal disclaimer.

(21) Appl. No.: 16/689,864

(22) Filed: Nov. 20, 2019

(65) Prior Publication Data

US 2020/0172232 A1 Jun. 4, 2020

Related U.S. Application Data

(60) Provisional application No. 62/772,700, filed on Nov. 29, 2018.

(51) Int. Cl.
*B64C 39/02* (2006.01)
*B62D 57/024* (2006.01)
(Continued)

(52) U.S. Cl.
CPC ............ *B62D 57/024* (2013.01); *B60G 3/01* (2013.01); *B60G 11/00* (2013.01); *B60K 1/02* (2013.01);
(Continued)

(58) Field of Classification Search
CPC .......... B64C 2201/12; B64C 2201/123; B64C 2201/126; B64C 2201/128;
(Continued)

(56) References Cited

U.S. PATENT DOCUMENTS 9,849,925 B2 * 12/2017 Outa .................... B62D 39/00
10,054,950 B2 * 8/2018 Carrasco Zanini ..... H02J 50/10
(Continued)

FOREIGN PATENT DOCUMENTS

CN 103192987 B 6/2015
CN 204526692 U 8/2015
(Continued)

OTHER PUBLICATIONS

International Search Report and Written Opinion in Corresponding PCT Application No. PCT/US2019/063381 dated Mar. 11, 2020. 13 pages.
(Continued)

*Primary Examiner* — Richard R. Green
*Assistant Examiner* — Michael A. Fabula
(74) *Attorney, Agent, or Firm* — Leason Ellis LLP

(57) ABSTRACT

An unmanned aerial vehicle (UAV) includes a body constructed to enable the UAV to fly and three or more legs connected to the body and configured to land and perch the UAV on a curved ferromagnetic surface. Each leg includes a first portion connected to the body, a second portion including a magnet and configured to magnetically attach and maintain the magnetic attachment of the leg to the ferromagnetic surface during the landing and perching, and a passive articulation joint connecting the first and second portions and configured to passively articulate the second portion with respect to the first portion in response to the second portion approaching the ferromagnetic surface. The UAV further includes a releasable crawler including mag-
(Continued)

netic wheels which detach the crawler from the body during the perching and maneuver the crawler on the ferromagnetic surface while magnetically attaching the crawler to the ferromagnetic surface after detachment.

27 Claims, 8 Drawing Sheets

(51) Int. Cl.

| | | |
|---|---|---|
| B60K 1/02 | (2006.01) | |
| B62D 21/09 | (2006.01) | |
| B60G 3/01 | (2006.01) | |
| B60G 11/00 | (2006.01) | |
| B62D 61/12 | (2006.01) | |
| B60R 11/00 | (2006.01) | |
| G01N 29/265 | (2006.01) | |
| G01N 29/04 | (2006.01) | |
| B62D 9/00 | (2006.01) | |
| B64C 25/24 | (2006.01) | |
| B64C 25/36 | (2006.01) | |
| B64C 25/40 | (2006.01) | |
| B64D 1/02 | (2006.01) | |
| G01B 17/02 | (2006.01) | |
| G05D 1/00 | (2006.01) | |
| G05D 1/10 | (2006.01) | |
| B64C 25/32 | (2006.01) | |
| G06T 7/50 | (2017.01) | |
| G01S 17/86 | (2020.01) | |
| G01S 17/89 | (2020.01) | |
| H04N 5/222 | (2006.01) | |
| G06V 20/10 | (2022.01) | |

(52) U.S. Cl.
CPC ............. *B60R 11/00* (2013.01); *B62D 9/002* (2013.01); *B62D 21/09* (2013.01); *B62D 61/12* (2013.01); *B64C 25/24* (2013.01); *B64C 25/32* (2013.01); *B64C 25/36* (2013.01); *B64C 25/405* (2013.01); *B64C 39/02* (2013.01); *B64C 39/024* (2013.01); *B64D 1/02* (2013.01); *G01B 17/02* (2013.01); *G01N 29/04* (2013.01); *G01N 29/265* (2013.01); *G01S 17/86* (2020.01); *G01S 17/89* (2013.01); *G05D 1/0088* (2013.01); *G05D 1/0094* (2013.01); *G05D 1/101* (2013.01); *G06T 7/50* (2017.01); *G06V 20/10* (2022.01); *H04N 5/2226* (2013.01); *B60R 2011/004* (2013.01); *B60R 2011/008* (2013.01); *B60R 2011/0084* (2013.01); *B64C 2201/027* (2013.01); *B64C 2201/12* (2013.01); *B64C 2201/123* (2013.01); *B64C 2201/127* (2013.01); *B64C 2201/141* (2013.01); *B64C 2201/18* (2013.01); *G01N 2291/0289* (2013.01); *G01N 2291/02854* (2013.01); *G06T 2207/10028* (2013.01)

(58) Field of Classification Search
CPC ... B64C 2201/18; B64C 39/02; B64C 25/001; B64D 1/08; B64D 1/22
See application file for complete search history.

(56) References Cited

U.S. PATENT DOCUMENTS

| | | | |
|---|---|---|---|
| 10,081,421 B2 | 9/2018 | Semke et al. | |
| 10,133,277 B1* | 11/2018 | Carrasco Zanini | .. G05D 1/0225 |
| 10,239,347 B2* | 3/2019 | Abdellatif | ............. B60B 19/006 |
| 11,097,796 B2* | 8/2021 | Abdellatif | ............. B62D 9/002 |
| 2009/0294573 A1 | 12/2009 | Wilson et al. | |
| 2015/0153312 A1* | 6/2015 | Gonzalez | ............. B60B 19/003 |
| | | | 901/44 |
| 2016/0280359 A1* | 9/2016 | Semke | .................. B64C 27/006 |
| 2017/0166004 A1* | 6/2017 | Parrott | ................. B60B 19/003 |
| 2017/0267345 A1* | 9/2017 | Marom | .................. B64D 1/08 |
| 2018/0061148 A1 | 3/2018 | Dudar et al. | |
| 2018/0232874 A1* | 8/2018 | Østervold | ................ G01B 7/06 |
| 2018/0306628 A1* | 10/2018 | Parrott | ................. G05D 1/0255 |
| 2019/0015971 A1* | 1/2019 | Carrasco Zanini | ... B60B 19/006 |
| 2019/0017656 A1* | 1/2019 | Carrasco Zanini | ... B60B 19/006 |
| 2019/0061922 A1 | 2/2019 | Zanini et al. | |
| 2019/0064818 A1* | 2/2019 | Carrasco Zanini | ..... G01S 17/89 |
| 2019/0205644 A1* | 7/2019 | Birchbauer | ............ G05D 1/104 |
| 2019/0242743 A1* | 8/2019 | Patel | .................... G05D 1/0272 |
| 2020/0140081 A1* | 5/2020 | Levy | ......................... B60F 5/02 |
| 2020/0174478 A1* | 6/2020 | Abdellatif | ............ G05D 1/0088 |
| 2021/0070438 A1* | 3/2021 | Hoshide | ................ B64C 39/024 |
| 2021/0142271 A1* | 5/2021 | Burch, V | .............. B64C 39/024 |

FOREIGN PATENT DOCUMENTS

| | | |
|---|---|---|
| CN | 207207653 U | 4/2018 |
| CN | 108944302 A | 12/2018 |
| IN | 2012CH04148 A | 4/2012 |
| JP | 2017115787 A | 6/2017 |
| KR | 101491076 B1 | 2/2015 |
| KR | 20160129786 A | 11/2016 |
| KR | 20170054896 A | 5/2017 |

OTHER PUBLICATIONS

Anonymous: Magnetsystem mit beweglichem Gewindezapfen und Kugelgelenk—Ferrit: Amazon. De Baumark Dec. 9, 2015 URL: https://www.amazon.de/Magnetsystem-mit-beweglichem-Geqindezapfen-Kugelgelenk/dp/B0194JPKFC [retrieved on Feb. 24, 2020].

* cited by examiner

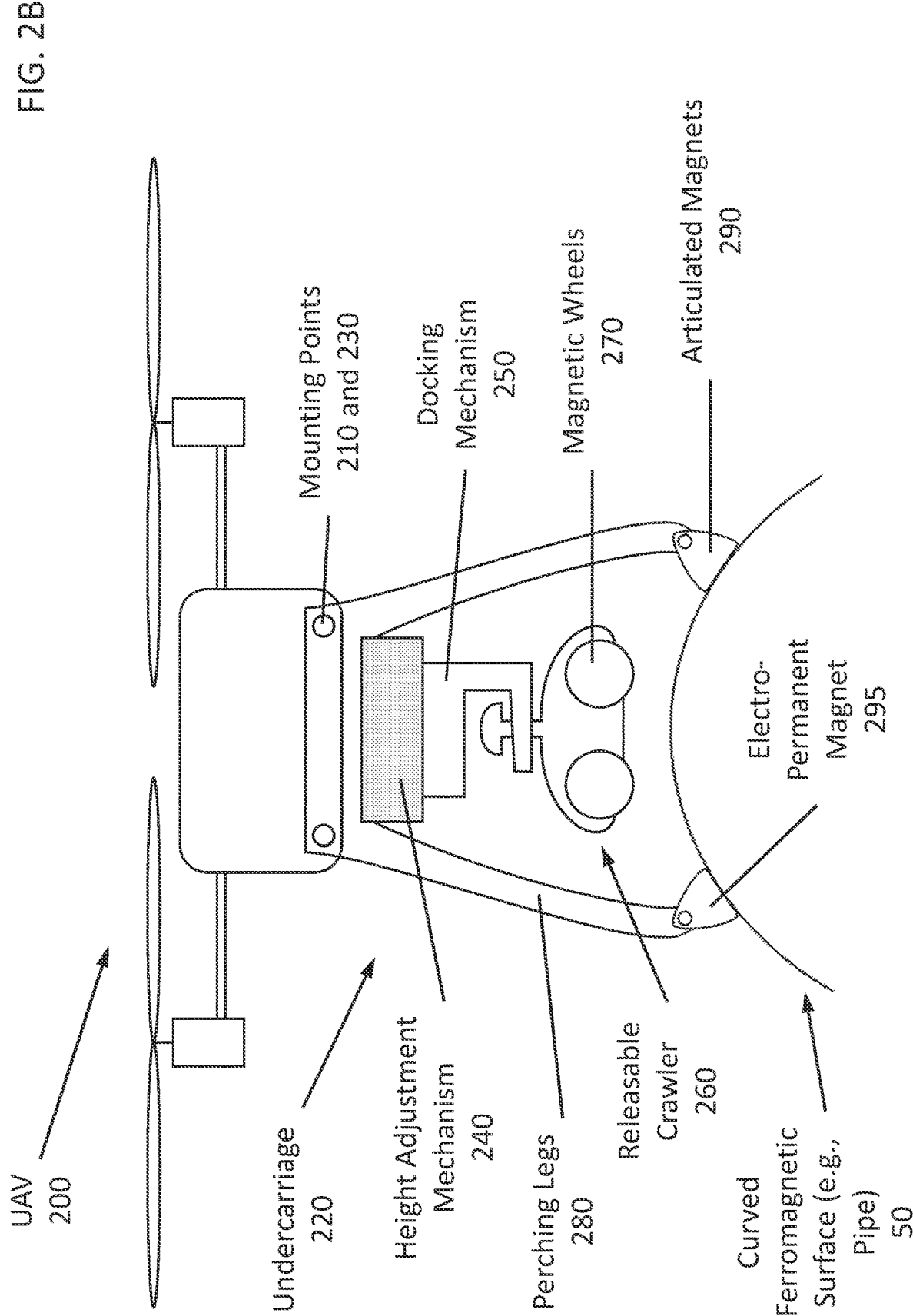

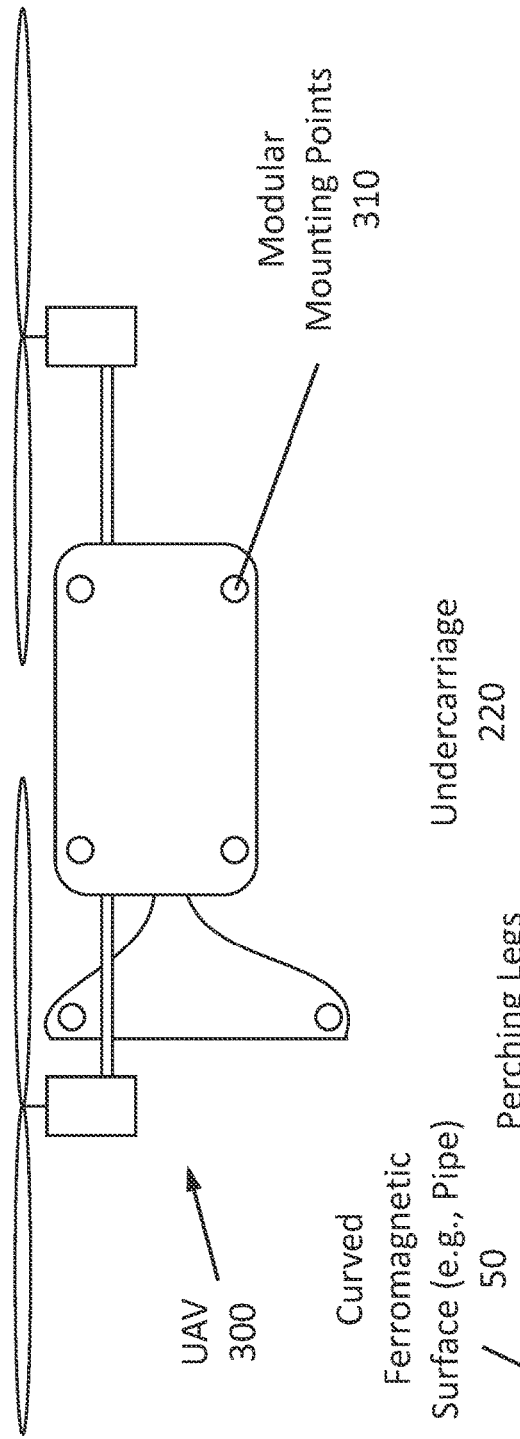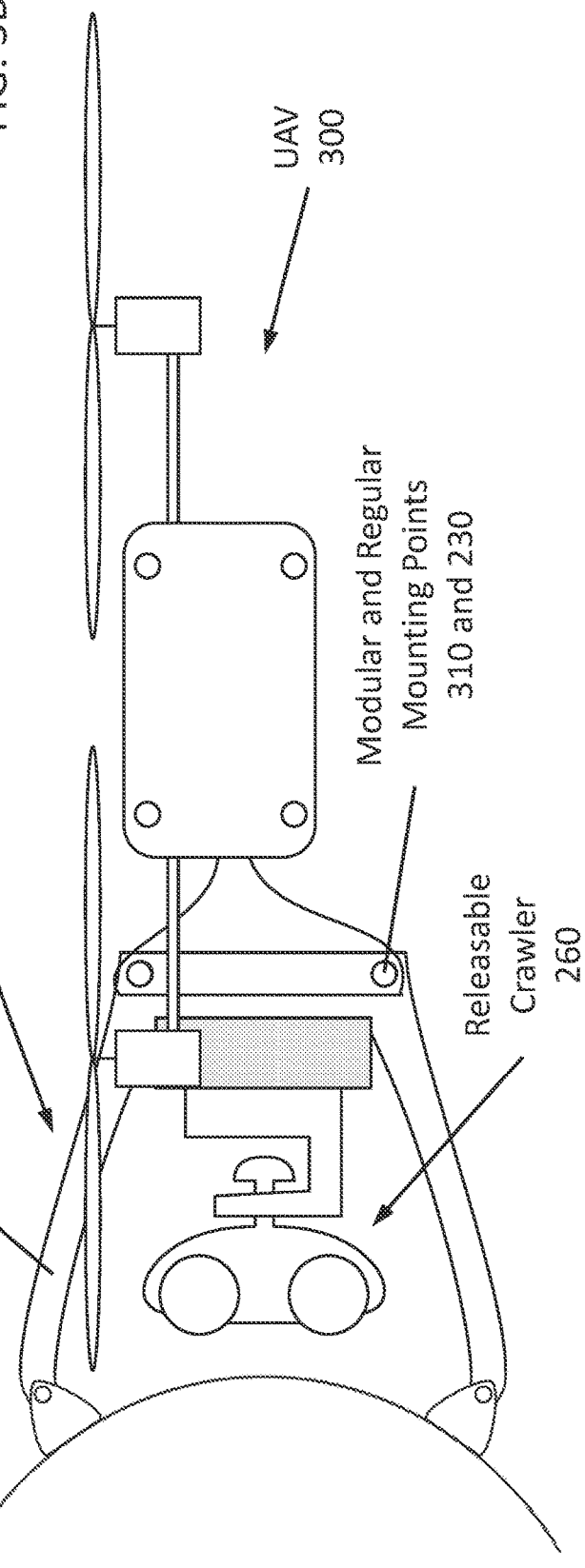

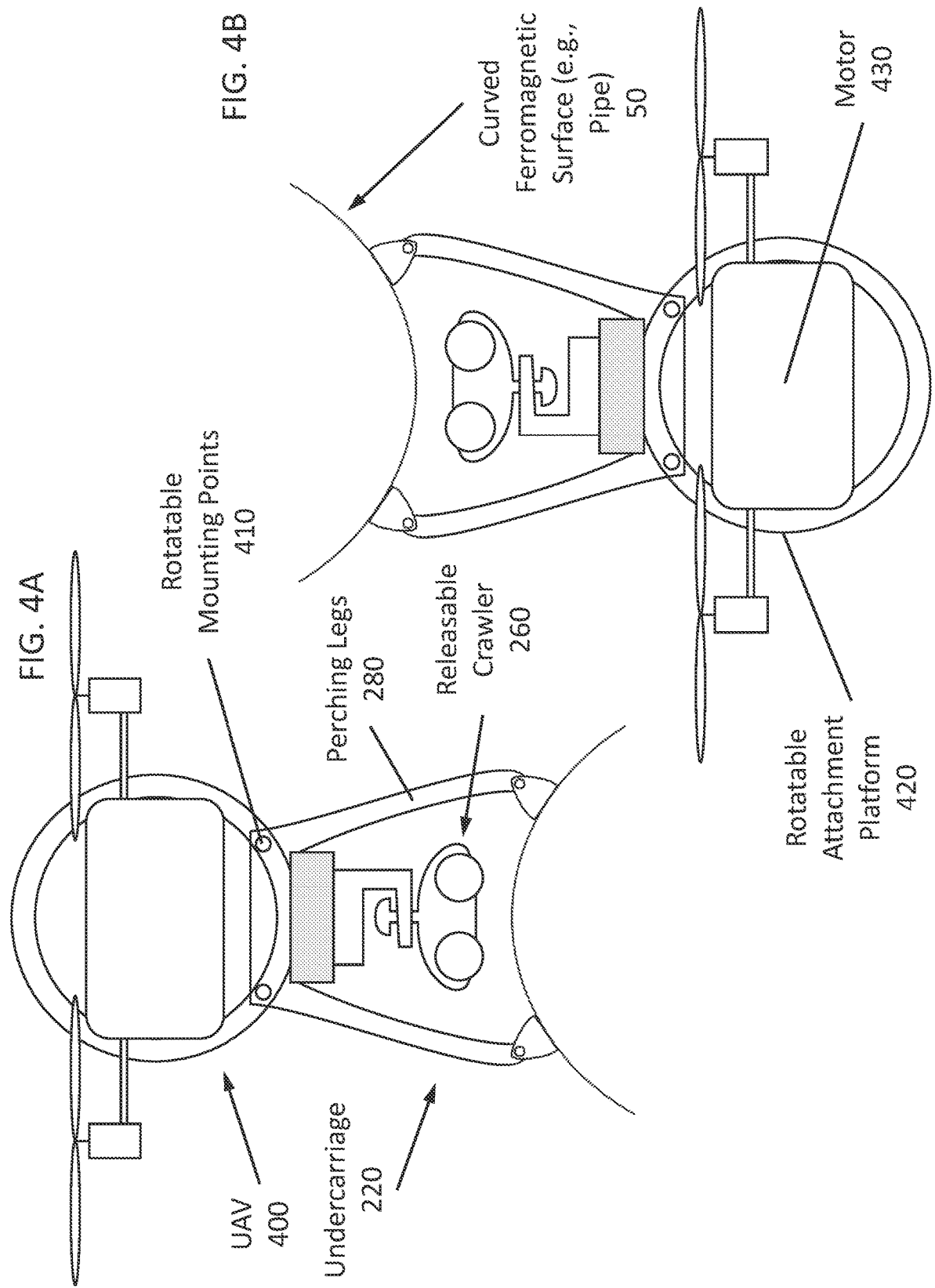

PERCHING UAV WITH RELEASABLE
CRAWLER

CROSS-REFERENCE TO RELATED
APPLICATION

The present application claims the benefit of U.S. Provisional Application No. 62/772,700, titled PERCHING UAV WITH RELEASABLE CRAWLER, filed on Nov. 29, 2018 with the U.S. Patent and Trademark Office, which is hereby incorporated by reference in its entirety.

FIELD OF THE DISCLOSURE

The present disclosure relates generally to the inspection and maintenance of a structure, and specifically to a perching unmanned aerial vehicle (UAV) having a releasable and re-dockable crawler for inspecting and maintaining the structure.

BACKGROUND OF THE DISCLOSURE

The inspection and maintenance of exposed metallic assets, such as pipes, storage tanks, and the like, can be difficult or impractical to perform by humans in some environments. In such circumstances, the use of automated UAV's (or drones) may assist in providing a workable alternative. However, such inspection and maintenance tasks are often best performed using direct contact on the asset, versus hovering at a distance from the asset, or maneuvering a UAV on the asset. In particular, performing a complete circumferential scan of a pipe (or other asset) using a drone is a challenging task.

It is in regard to these and other problems in the art that the present disclosure is directed to provide a technical solution for an effective perching UAV having a releasable crawler for inspecting or maintaining a structure.

SUMMARY OF THE DISCLOSURE

According to an embodiment, an unmanned aerial vehicle (UAV) is provided. The UAV comprises: a body constructed to enable the UAV to fly; and three or more legs connected to the body and configured to land and perch the flying UAV on a curved ferromagnetic surface. Each leg includes: a first portion connected to the body; a second portion comprising a magnet and configured to magnetically attach the leg to the ferromagnetic surface during the landing and to maintain the magnetic attachment of the leg to the ferromagnetic surface during the perching; and a passive articulation joint connecting the first portion to the second portion and configured to passively articulate the second portion with respect to the first portion in response to the second portion approaching the ferromagnetic surface during the landing. The UAV further comprises a releasable crawler comprising magnetic wheels configured to: detach the crawler from the body during the perching; and maneuver the crawler on the ferromagnetic surface while magnetically attaching the crawler to the ferromagnetic surface after the detaching.

In an embodiment, the crawler further comprises a probe or tool configured to inspect or maintain the ferromagnetic surface during the maneuvering.

In an embodiment, the crawler further comprises a wireless communication circuit configured to communicate wirelessly with the UAV or a base station.

In an embodiment, the magnetic wheels are further configured to re-dock the crawler with the body after the maneuvering.

In an embodiment, each magnet comprises a permanent magnet.

In an embodiment, each magnet comprises a switchable permanent magnet.

In an embodiment, each magnet comprises an electro-permanent magnet.

In an embodiment, the UAV further comprises a detachment actuator configured to apply leverage to the second portion of one or more of the legs magnetically attached to the ferromagnetic surface, in order to assist with magnetically detaching the one or more of the magnetically attached legs from the ferromagnetic surface during takeoff of the perched UAV from the ferromagnetic surface.

In an embodiment, the UAV further comprises a laser scanner connected to the body and configured to provide sensing data to orient the UAV during the landing.

In an embodiment, the magnetic wheels comprise four magnetic wheels, and the crawler further comprises two motors each configured to drive two of the four magnetic wheels.

In an embodiment, the magnetic wheels comprise omni-wheels or Mecanum wheels.

According to another embodiment, an unmanned aerial vehicle (UAV) is provided. The UAV comprises: a first body constructed to enable the UAV to fly and having a plurality of first attachment points; and an undercarriage. The undercarriage comprises: a second body having a corresponding plurality of second attachment points and mounted to the first body at corresponding pairs of the first and second attachment points; and three or more legs connected to the second body and configured to land and perch the flying UAV on a curved ferromagnetic surface. Each leg includes: a first portion connected to the second body; a second portion comprising a magnet and configured to magnetically attach the leg to the ferromagnetic surface during the landing and to maintain the magnetic attachment of the leg to the ferromagnetic surface during the perching; and a passive articulation joint connecting the first portion to the second portion and configured to passively articulate the second portion with respect to the first portion in response to the second portion approaching the ferromagnetic surface during the landing. The undercarriage further comprises a releasable crawler comprising magnetic wheels configured to: detach the crawler from the second body during the perching; and maneuver the crawler on the ferromagnetic surface while magnetically attaching the crawler to the ferromagnetic surface after the detaching.

In an embodiment, the crawler further comprises a probe or tool configured to inspect or maintain the ferromagnetic surface during the maneuvering.

In an embodiment, the crawler further comprises a wireless communication circuit configured to communicate wirelessly with the UAV or a base station.

In an embodiment, the magnetic wheels are further configured to re-dock the crawler with the second body after the maneuvering.

In an embodiment, each magnet comprises a permanent magnet.

In an embodiment, each magnet comprises a switchable permanent magnet.

In an embodiment, each magnet comprises an electro-permanent magnet.

In an embodiment, the UAV further comprises a detachment actuator configured to apply leverage to the second portion of one or more of the legs magnetically attached to the ferromagnetic surface, in order to assist with magnetically detaching the one or more of the magnetically attached legs from the ferromagnetic surface during takeoff of the perched UAV from the ferromagnetic surface.

In an embodiment, the UAV further comprises a laser scanner connected to the first body and configured to provide sensing data to orient the UAV during the landing.

In an embodiment, the magnetic wheels comprise four magnetic wheels, and the crawler further comprises two motors each configured to drive two of the four magnetic wheels.

In an embodiment, the magnetic wheels comprise omni-wheels or Mecanum wheels.

In an embodiment, the undercarriage further comprises: a docking mechanism configured to secure the crawler to the second body during the flying; and a height adjustment mechanism configured to adjust the height of the crawler with respect to the ferromagnetic surface during the perching.

In an embodiment: the first body further has a corresponding plurality of third attachment points and the second body is configured to detach from the first body at the first attachment points and to mount to the first body at corresponding pairs of the third and second attachment points.

In an embodiment, the first body comprises a movable attachment platform having the first attachment points and configured to move the first attachment points relative to a remainder of the first body.

In an embodiment, the UAV further comprises a motor configured to move the attachment platform during the flying.

In an embodiment, the movable attachment platform is further configured to rotate the first attachment points about an axis of the first body.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIGS. 2A and 2B are exploded and profile views, respectively, of an example UAV or drone configured with an undercarriage having (1) perching legs for perching on a structure and (2) a crawler for releasing from the perched UAV on the structure to inspect or maintain the structure, according to an embodiment.

FIG. 3A is a profile view of an example UAV having modular mounting points for attaching the undercarriage of FIGS. 2A and 2B, while FIGS. 3B and 3C are profile views of the UAV with the attached undercarriage at side and top orientations, respectively, with respect to the UAV, according to an embodiment.

FIGS. 4A, 4B, and 4C are profile views of an example UAV having rotatable mounting points for attaching the undercarriage of FIGS. 2A through 3C, together with the attached undercarriage at bottom, top, and side orientations, respectively, with respect to the UAV, according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1A:
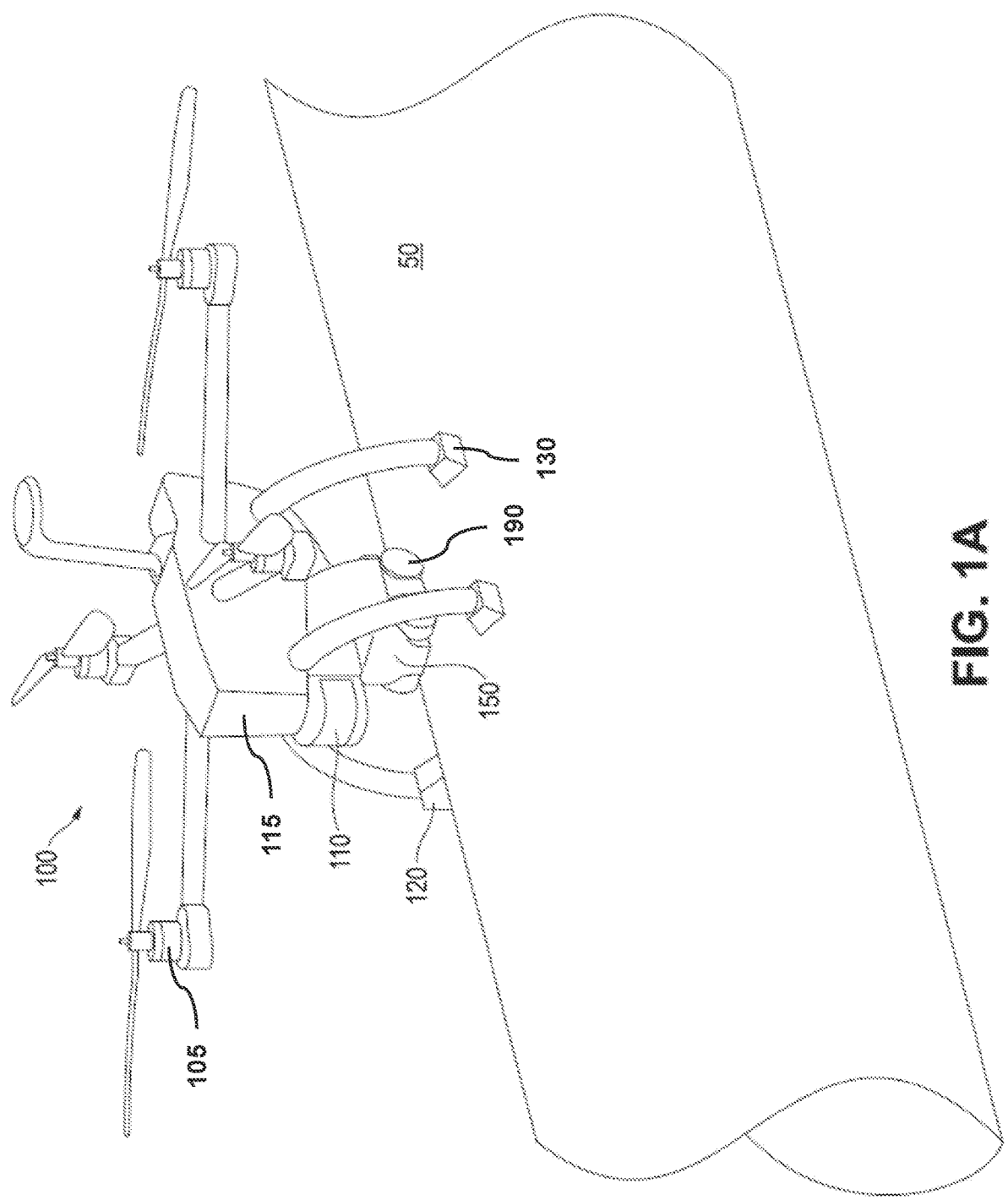
FIGS. 1A and 1B are illustrations of an example UAV perching on a structure (for example, a pipe), with the UAV having a releasable crawler for inspecting or maintaining the structure, according to an embodiment. The crawler is shown attached to the UAV in FIG. 1A and not attached to the UAV (e.g., crawling on the structure) in FIG. 1B.

In various example embodiments, a perching UAV having a releasable crawler for inspecting or maintaining a structure, such as an elevated or otherwise difficult-to-access pipe or storage tank, is provided. The UAV is a hybrid UAV that has advanced capabilities to perform contact inspection jobs on curved ferromagnetic surfaces such as carbon steel pipes, storage tanks, and other structures. The UAV can fly towards a pipe to be inspected, land on it autonomously (commonly referred to as perching), and deploy a releasable magnetic crawler to crawl around the pipe to perform, for example, elaborate inspection jobs at any angle of orientation. The crawler may also be configured to perform maintenance on the pipe. As will be appreciated from the following discussion, the UAV can land, for example, on top of, along the side of, or underneath a pipe or other structure, and in each instance is said to have landed on the structure.

As discussed earlier, the inspection and maintenance of exposed metallic assets, such as pipes, storage tanks, and the like, can sometimes be difficult or impractical to perform by people. For instance, one of the top challenges in the oil and gas industry is the periodic inspection of elevated assets found in refineries, gas plants, offshore platforms, and other plants and facilities. These assets include high elevation pipes and structures that are difficult to access during inspection or maintenance jobs. Sometimes the only way for people to inspect or maintain them is to erect scaffolding in order for the inspector or engineer to access the asset and perform, for example, manual inspection using an ultrasonic testing (UT) sensor for thickness measurements. Such scaffolding is not only expensive and introduces a significant cost barrier for frequent inspection, but also poses safety concerns mainly in the form of falling and tripping hazards.

Accordingly, in example embodiments, a perching UAV having a releasable crawler provides a solution to the aforementioned technical problems by having two vehicles in a mother/child configuration. Each vehicle is designed or optimized to perform the capabilities for which it is best suited. The vehicles include a perching UAV capable of flying and landing on a pipe, and a smaller magnetic crawler that is carried by and released from the UAV after landing or perching. The crawler can rove on the pipe and perform, for example, inspection scans such as thickness measurements using a UT sensor. For example, in some embodiments, both the UAV and the crawler attach magnetically to the curved surface of the pipe or other asset being inspected or maintained. As such, the crawler can perform complete longitudinal or circumferential scans of the asset (even upside down with respect to gravity).

This provides for a more feasible approach than having the whole UAV crawl around the pipe, which requires larger and heavier motors and risks collisions with nearby pipes and assets, especially with limited clearance constraints. The perched UAV also saves energy (e.g., electrical energy, battery energy) by being perched on the pipe (such as on top of the pipe) as opposed to hovering near the pipe. Perching the UAV on the surface of the pipe also allows the releasable crawler to release from or re-dock with the UAV more easily than when the UAV hovers next to the pipe. In addition, perching provides more stability and reduces risks compared to hovering.

Figure 1B:
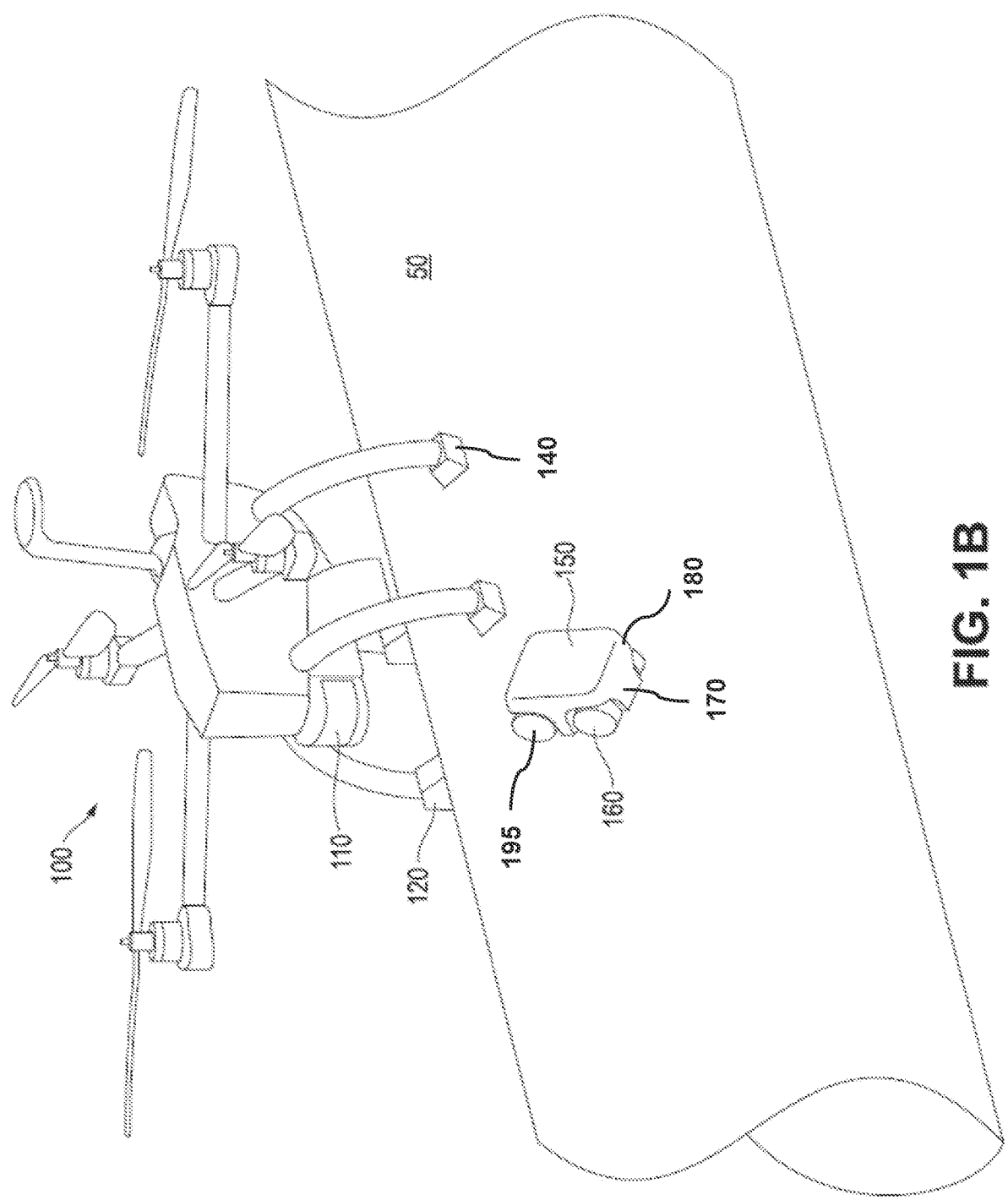

FIGS. 1A and 1B are illustrations of an example UAV 100 perching on a structure 50 (for example, a pipe), with the UAV 100 having a releasable crawler 150 for inspecting or maintaining the structure 50, according to an embodiment. The crawler 150 is shown attached to the UAV 100 in FIG. 1A and not attached to the UAV 100 (e.g., crawling on the structure 50) in FIG. 1B. For ease of description, it is assumed throughout that the structure 50 is larger (such as significantly larger) than the UAV 100. For example, the structure 50 is larger in every dimension than the UAV 100, or the structure 50 presents a larger footprint on which to land than the footprint of the UAV 100. In addition, it is assumed for ease of description that the structure 50 (or any structure described herein) is a pipe, such as an eight inch or larger diameter pipe.

FIGS. 1A and 1B show the mother-child configuration in action. FIG. 1A shows the UAV 100 after landing on the pipe 50 with the crawler 150 still docked in it. FIG. 1B shows the crawler 150 after being released from the UAV 100 to perform the inspection job. The crawling capability provided by the releasable crawler 150 gives the UAV 100 important features for inspection and maintenance jobs, such as easier accessibility (e.g., landing does not have to be on the exact spot where inspection or maintenance takes place). The crawling further provides for circumferential and longitudinal scans. For instance, in the oil and gas industry, it is important to perform full scans of the pipe 50 to find the minimum steel thickness on a certain area of the pipe 50. Such scans often include circumferential scans and longitudinal scans, for which crawling is well suited. The crawling further provides for power efficiency during multiple inspections (e.g., crawling between multiple inspection sites on the same pipe is more power efficient than flying).

In FIGS. 1A and 1B, the UAV 100 utilizes four articulated magnets 120 (such as permanent magnets or switchable permanent magnets). To accommodate the landing of the UAV 100 on the pipe 50, each of the magnets 120 (or more precisely, its magnetic field) articulates with a perpendicular orientation with respect to the pipe 50 when the UAV 100 has landed or is perching on the pipe 50.

In some embodiments, the magnetic fields of the articulated magnets 120 are actively switchable on and off (e.g., to allow for easy detachment after job completion). A laser scanner 110 (e.g., light detection and ranging, or LIDAR) is included in order to measure, for example, the pipe's relative location with respect to the UAV 100 during the automated landing maneuver as a form of real-time feedback. In some embodiments, the miniature crawler 150 is connected by a wire (e.g., for power and communication) and includes a UT sensor, four magnetic wheels 160, and two motors to drive the wheels 160 in corresponding pairs (e.g., front and rear, such as from front motor 272 and rear motor 274 of FIG. 2A). The wire also allows the rest of the electronics and batteries for carrying out the inspection or maintenance to be located in the main UAV body 100. This reduces the size, weight, and complexity of the crawler 150.

In some other embodiments, the crawler 150 includes a different number of wheels 160 (e.g., two or three wheels, or more than four) and their type (e.g., omniwheels (such as omniwheel 190), mecanum wheels (such as Mecanum wheel 195), to name a few). Unlike an unmanned ground vehicle (UGV), the magnetic crawler 150 has to contend with various curvatures and various directions (as illustrated throughout) of pipe inspection or maintenance. As such, in some embodiments, the magnetic crawler 150 has special locomotion systems to navigate pipe curvatures (or similar curvatures from other curved structures or vessels).

In some embodiments, communication between the crawler 150 and the UAV 100 is wired. For example, using a small spool of a thin cord, the crawler 150 can be connected to the UAV 100 for power and communication. This can eliminate, for example, the need to host a battery and other electronics inside the crawler 150, making it smaller and saving total weight by utilizing some of the components already existing in the UAV 100.

In some other embodiments, communication between the crawler 150 and the UAV 100 is wireless. Here, the crawler 150 includes its own battery and electronics (such as wireless communication circuit 180), to provide for a more standalone vehicle. This can be useful, for example, when the UAV 100 picks up the crawler 150 from the ground and deploys it on the pipe 50, at which point the UAV 100 can fly to do some other inspection jobs and then go back to pick the crawler 150 up. This can also be useful for numerous crawlers 150 (e.g., a swarm of crawlers 150) to inspect multiple assets, with the UAV 100 working on picking them up one-by-one or in batches from the ground towards their destination and retrieving them upon job completion. In different embodiments, the wireless connection can be between the crawler(s) 150 and either the UAV 100 or an operator's control station, or both the UAV 100 and the operator's control station.

In an embodiment, the UAV 100 includes a body constructed to enable the UAV 100 to fly (e.g., having rotors, control and guidance devices, and the like, such as propulsors 105 and guidance circuitry 115). The UAV 100 also includes three or more legs connected to the body and configured to land and perch the flying UAV 100 on a curved ferromagnetic surface 50. Each leg includes a top (or main) portion connected to the body, and a bottom portion that includes a permanent magnet 120. The bottom portion is configured to magnetically attach the leg to the ferromagnetic surface 50 during the landing and to maintain the magnetic attachment of the leg to the ferromagnetic surface during the perching. In addition, a passive articulation joint connects the top and bottom portions of the leg, and passively articulates (e.g., pivots) the bottom portion with respect to the top portion in response to the bottom portion approaching the ferromagnetic surface 50 during the landing. The UAV 100 further includes a releasable crawler 150 having magnetic wheels 160. The magnetic wheels 160 allow the crawler 150 to detach from the UAV 100 during the perching, and to maneuver the crawler 150 on the ferromagnetic surface 50 while magnetically attaching the crawler 150 to the ferromagnetic surface 50 after the detaching.

In different embodiments, different landing mechanisms of the UAV 100 can be used. These can include different types of adhesion mechanisms such as magnetic or non-magnetic. Examples of magnetic landing mechanisms include magnets that can be shut-off or overcome by a mechanical means during takeoff from the pipe 50. Such magnets include switchable permanent magnets (such as switchable permanent magnet 130 of FIG. 1A), permanent magnets with an actuated leverage (such as detachment actuator 140 of FIG. 1B) to aid in detachment during takeoff, electro-permanent magnets (such as electro-permanent magnet 295 of FIG. 2A), and electromagnets. It should be noted, however, that continuous power consumption can be a disadvantage for electromagnets. Non-magnetic adhesion mechanisms can be used for non-ferromagnetic surfaces such as stainless steel, composite pipes, and concrete walls.

Such mechanisms include micro-spines, dry gecko-inspired adhesives (e.g., synthetic setae), suction cups, grippers, and claws.

In different embodiments, different crawler payloads or designs are used. For simplicity, these payloads or designs fall into two basic categories: inspection and maintenance. Inspection payloads and designs include a range of different types of sensors that are often used in the oil and gas industry to inspect pipes and structures. For example, in some embodiments, a UT sensor is used for thickness measurement. For ease of description, a UT sensor for thickness measurement is used throughout at times to represent an example device and application for inspection and maintenance. However, other embodiments are not limited to such a device or application. For instance, other inspection sensors or probes (such as probe or tool 170) can be used instead of or in addition to the UT sensor depending on the job, including (but not limited to) eddy current sensors and alternating current field measurement (ACFM) sensors.

In still other embodiments, the crawler 150 is configured with one or more tools (such as probe or tool 170) and used for maintenance purposes. For example: the crawler 150 can be used to perform light maintenance jobs such as cleaning, surface preparation, and coating repairs. In still yet other embodiments, the crawler 150 is configured with one or more cameras and used for visual inspection. For instance, in some embodiments, a camera is used for simple visual inspection jobs, such as where only videos or photos of areas of interest need to be obtained, but for which the areas are difficult to inspect directly by the UAV 100.

In some embodiments, the crawler 150 is configured to leave markers (such as paint or QR codes) behind on areas of interest (such as locations where the sensor readings are outside of normal levels, or where faults are detected). These locations, for example, can be where critical thickness levels are detected. In some such embodiments, after the crawler 150 re-docks and the UAV 100 flies away, the UAV 100 scans these markers and creates a 3D reconstruction of the environment showing the exact location of these markers. In some such embodiments, the UAV 100 uses an on-board RGB-D camera to detect the markers and compute their locations with respect to the UAV 100. Using the UAV's GPS position, absolute locations of the markers can be computed or otherwise determined. It should be noted that while the UAV 100 is scanning the markers, the crawler 150 can, for example, stay on the pipe 50 or be re-docked with the UAV 100.

In some embodiments, the crawler 150 uses wireless localization to identify problem locations on the asset, such as with virtual markers. In other words, the locations of faults can be determined even without physical markers, albeit with less precision. This is because the crawler's location with respect to the UAV 100 can be computed (or otherwise determined) using wireless sensors. For example, in some such embodiments, the UAV 100 carries an ultra-wide band (UWB) sensor array that receives wireless signals for another UWB transmitter that is mounted on the crawler 150. The crawler's relative location can then be measured regardless of whether the UAV 100 is in flight or attached to the pipe 50. In some embodiments, whenever an operator finds a fault while crawling, the crawler location with respect to the UAV 100 is tagged and captured. With the UAV's GPS sensor, the absolute positions of these faults can be determined. In some embodiments, when GPS is not available, the UAV's location is estimated based on the flight trajectory and IMU data from its home base, where GPS is available.

In some embodiments, previously computed (or determined) inspection locations are transferred from the UAV 100 to an operator computer, or a ground station. Then, the inspection locations are visualized on, for example, a previously-built 3D model of the inspected plant, or a 3D model that can be constructed from the UAV's onboard sensors, e.g., depth camera or 3D LIDAR. In addition, in some such embodiments, the visualized locations are annotated with the corresponding measured thicknesses (or other sensed values or information).

Figure 2A:
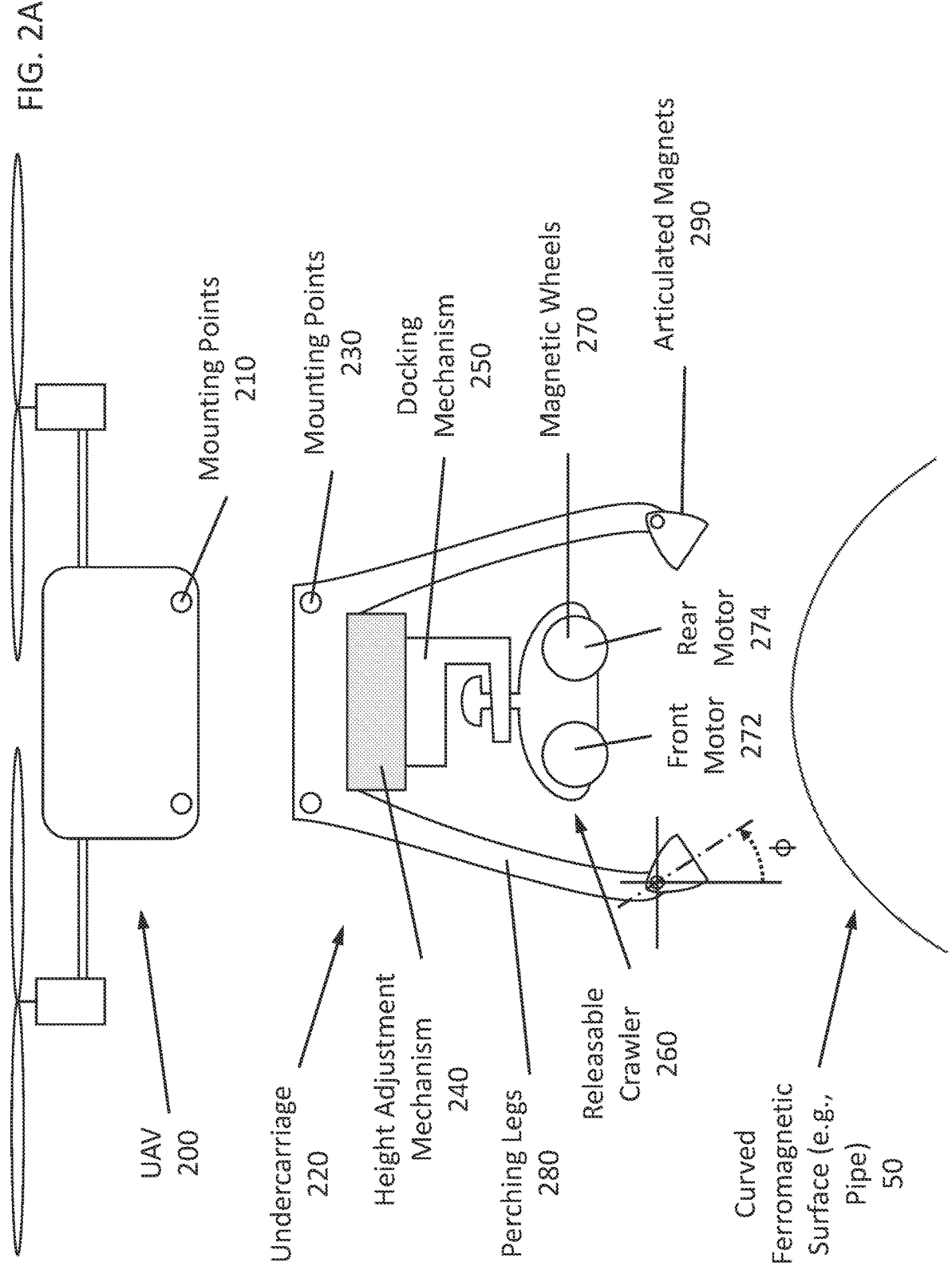

FIGS. 2A and 2B are exploded and profile views, respectively, of an example UAV 200 or drone configured with an undercarriage 220 having (1) perching legs 280 for perching on a structure 50 (such as a carbon steel pipe or other curved ferromagnetic surface 50) and (2) a crawler 260 for releasing from the perched UAV 200 on the structure 50 to inspect or maintain the structure 50, according to an embodiment. The crawler 260 has magnetic wheels 270 for maneuvering on while adhering to the curved ferromagnetic surface 50 (e.g., regardless of orientation with respect to gravity, even upside down). For ease of description, a pipe is used throughout as an example structure having a curved ferromagnetic surface. However, the described embodiments are equally applicable to other such structures, such as cylindrical or spherical storage tanks, having curved ferromagnetic surfaces. The UAV 200 or drone can include rotors (such as four or six rotors) and a control unit for adjusting the rotation speeds of the individual rotors to balance the load of the UAV 200 or cause the UAV 200 to move in a desired direction.

Referring to FIGS. 2A and 2B, the UAV 200 includes a set of mounting points 210 (also referred to as attachment points) for mating with a similar set of mounting points 230 of the undercarriage 220. In this fashion, any compatible UAV/undercarriage combination (e.g., compatible mounting points and payload capacities/weights) can be assembled for a desired purpose, in this case a releasable crawler 260 for deploying on the structure 50 and inspecting or maintaining the structure 50. To this end, the undercarriage 220 includes a set of perching legs 280 (e.g., four such legs 280), each with an articulated magnet 290 (such as electro-permanent magnet 295). The articulated magnets 290 are mounted to the legs 280 so as to permit for orienting towards and adhering to the curved ferromagnetic surface 50 when the UAV 200 approaches and perches on the surface 50.

Thus, as shown in FIG. 2A, the articulation joint enables pivoting, which can be in multiple axes such as when the joint comprises a universal joint, of the magnet 290 in its housing relative to the surface 50 to which the leg 280 is about to perch. The pivoting can be around an axis of the leg 280 or joint, as shown, to assume an angle φ relative to the axis, and optionally relative to additional angles. The UAV 200 and undercarriage 220 are configured primarily to perch and deploy/retrieve the crawler 260 to or from the top (or near the top) of a structure (e.g., to keep the rotors of the UAV 200 reasonably level before, during, and after perching).

In addition, the undercarriage 220 includes a height adjustment mechanism 240 (for example, a motor or other actuator) for lowering the crawler 260 from the perched UAV 200 to the surface 50 or for raising the crawler 260 from the surface 50 to the perched UAV 200. To assist with this, a docking mechanism 250 connects the height adjustment mechanism 240 to the crawler 260, such as with a docking port 250. The docking port allows the crawler 260 to disengage (e.g., drive away from) the perched UAV 200 once deployed on the surface 50 or to engage (e.g., drive into or onto) the perched UAV 200 when ready to leave the surface 50, such as to return to a home base or other structure or component to be inspected or maintained. The docking mechanism 250 may also allow for information or energy transfer between the UAV 200 and the crawler 260, such as to download instrumentation data from the crawler 260 to the UAV 200 or to recharge a battery of the crawler 260 from the UAV 200.

In further detail, in some embodiments, the height adjustment mechanism 240 is used to adjust the height of the crawler 260 based on the pipe diameter (e.g., to ensure successful release on the surface 50). For instance, on large pipes (or flat surfaces), the height of the docked crawler 260 to the surface 50 is greater than when on small diameter pipes. As such, for large pipes (or flat surfaces), the crawler 260 is deployed to a lower height to reach the surface 50 whereas on a small diameter pipe, the crawler 260 is deployed and released at a higher point. In addition, is some embodiments, the height adjustment mechanism 240 is used to re-dock the crawler 260 after job completion. This allows the docking mechanism 250 to be at the correct height with respect to the crawler 260. Again, different pipe diameters can have corresponding different heights. In some embodiments, the height adjustment mechanism 240 is used to pull the crawler 260 and break its magnetic attachment to the ferromagnetic surface 50.

In some embodiments, the height adjustment mechanism 240 is actuated, such as with a motor. In some embodiments, the height adjustment mechanism 240 is passive when it is not used to detach the crawler 260. For example, in one such embodiment, the height adjustment mechanism 240 is spring-loaded so that it can always be at maximum possible extension to press against the pipe 50 when the UAV 200 is perched and deploying the crawler 260.

In the UAV 200 with undercarriage 220, approaching and landing close to the top of the pipe 50 (e.g., 12 o'clock or near 12 o'clock position) with a straight or near straight angle is desirable, and usually provides for adhesion and proper perching of the legs 280. The perching legs 280 have features useful for successful perching and adhesion to the pipe 50. For instance, each leg 280 in the perching mechanism features an articulated magnet 290 (such as a permanent magnet or a switchable permanent magnet). The articulation of the leg 280 is passive in that the articulated magnet 290 is designed to articulate about the axes shown in FIG. 2A in response to the magnetic attraction of the magnet 290 and the ferromagnetic surface 50 when the UAV 200 (or more precisely, the attached undercarriage 220) is in close proximity to the target ferromagnetic surface 50, such as in response to initial contact between the two. It should be noted that the undercarriage 220 can be mounted on any UAV with the suitable mounting points (e.g., to mate with mounting points 230) and payload capacity (e.g., to carry and deploy the undercarriage 220 in flight).

In some embodiments, after deployment and job completion, the crawler 260 re-docks with the UAV 200, or more specifically, with the docking mechanism 250. The process of re-docking and takeoff from the ferromagnetic surface 50 by the UAV 200 with the crawler 260 also involves magnetically detaching the crawler 260 from the surface 50. In some such embodiments, the UAV 200 uses the height adjustment mechanism 240 to pry the crawler 260 away from the magnetic attraction of the magnetic wheels 270 of the crawler 260 and the ferromagnetic surface 50. In some other such embodiments, the magnetic wheels 270 use switchable magnets to disable adhesion to the ferromagnetic surface 50 after re-docking. In still some other such embodiments, the docking mechanism 250 includes a ramp that lies on the pipe 50 and is attached to the UAV 200. In such embodiments, the crawler 260 climbs the ramp while re-docking (such as parking onto an inclined driveway). In this way, the crawler's wheel motors (such as front motor 272 and rear motor 274) are used to force the magnets of the magnetic wheels 270 to detach using the driving torque of the crawler 260. The ramp can be made of a metallic material (e.g., steel) or a non-magnetic material, depending on factors such as weight, strength, and the like. In each such embodiment, magnetic attachment of the UAV 200 is achieved to enable the UAV 200 to fly to a next location together with the crawler 260 as a payload securely retained by the UAV 200.

Figure 3C:
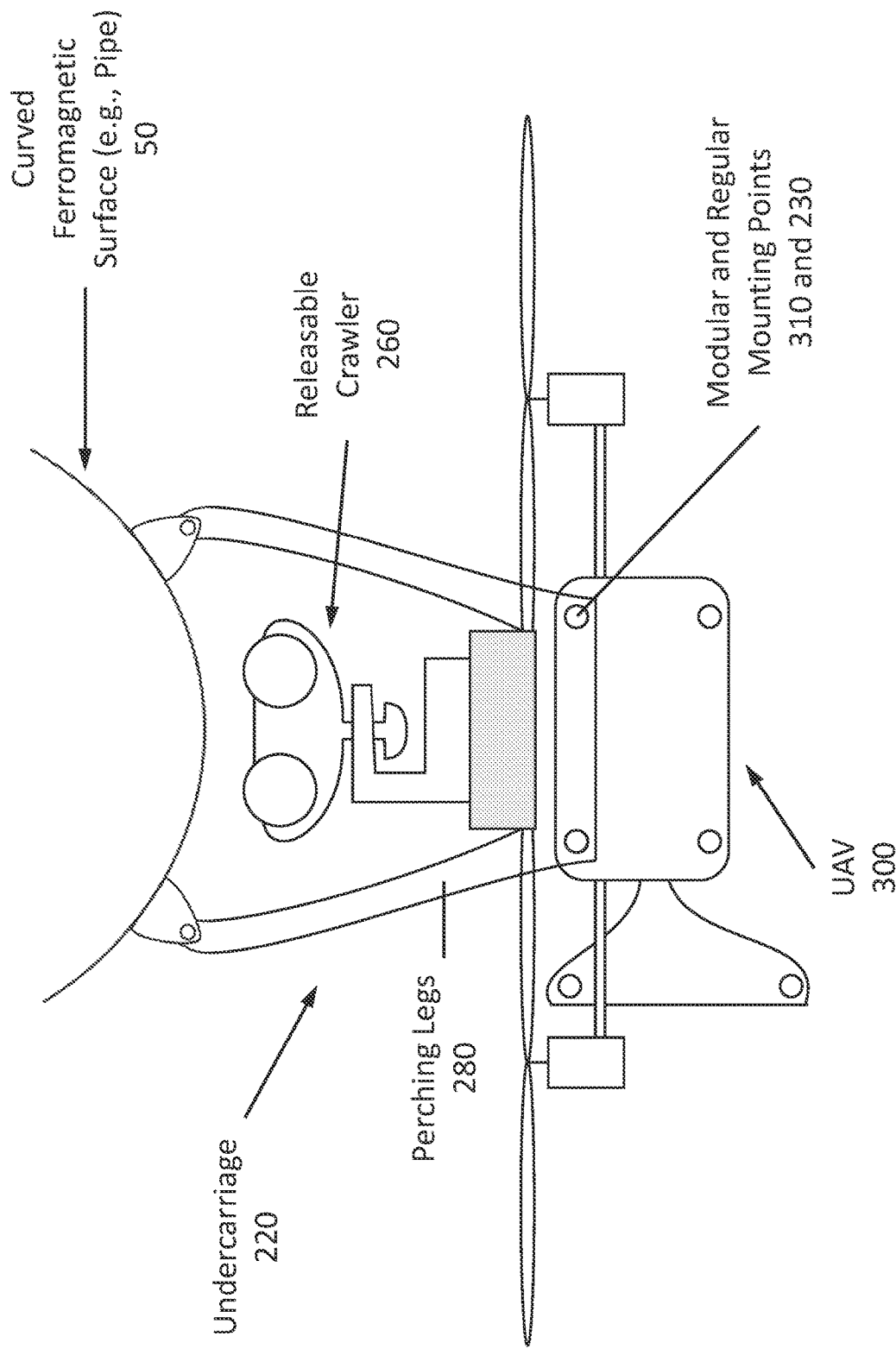

FIG. 3A is a profile view of an example UAV 300 having modular mounting points 310 for attaching the undercarriage 220 of FIGS. 2A and 2B, while FIGS. 3B and 3C are profile views of the UAV 300 with the attached undercarriage 220 at side and top orientations, respectively, with respect to the UAV 300, according to an embodiment. This modular approach allows for mounting the undercarriage 220 (payload) on, for example, the bottom, front, or top of the UAV 300 in order to allow for perching on the top, side, or bottom, respectively, of the pipe 50.

One of the biggest challenges in inspecting pipes in refineries is that many of the pipes are not accessible from the top because of obstacles such as racks, structures, and other pipes. In these cases, accessing or perching on such surfaces from other positions, such as from the side or bottom of the structure, is desirable. The UAV 300, together with the undercarriage 220 attached to a suitable set of mounting points 310, can perch on the top, side, or bottom of the pipe 50 using adaptable perching legs 280, as illustrated in FIGS. 3A, 3B, and 3C, respectively.

In further detail, each leg 280 is designed with an articulated magnet 290 that breaks the leg 200 into two distinct parts, a main body rigidly mounted to the undercarriage 220 and a moving (or articulating) magnet 290. This provides the leg 280 with at least a rotational degree of freedom, which allow the magnets 290 to passively realign their orientation (e.g., perpendicular) toward the pipe 50 during landing for perfect or near perfect adhesion.

It should be noted that for ease of 2D side view illustration, features like the rotors of the UAV 300 are sometimes shown as contacting other parts of the UAV 300 (such as the perching legs 280). However, this is because the depth dimension (in which such features would not overlap) is not illustrated. The rotors of the UAV 300 do not obstruct the undercarriage 220 in any configured orientation of the undercarriage 220 (e.g., the undercarriage 220 is between the rotors when viewed from above).

Figure 4C:
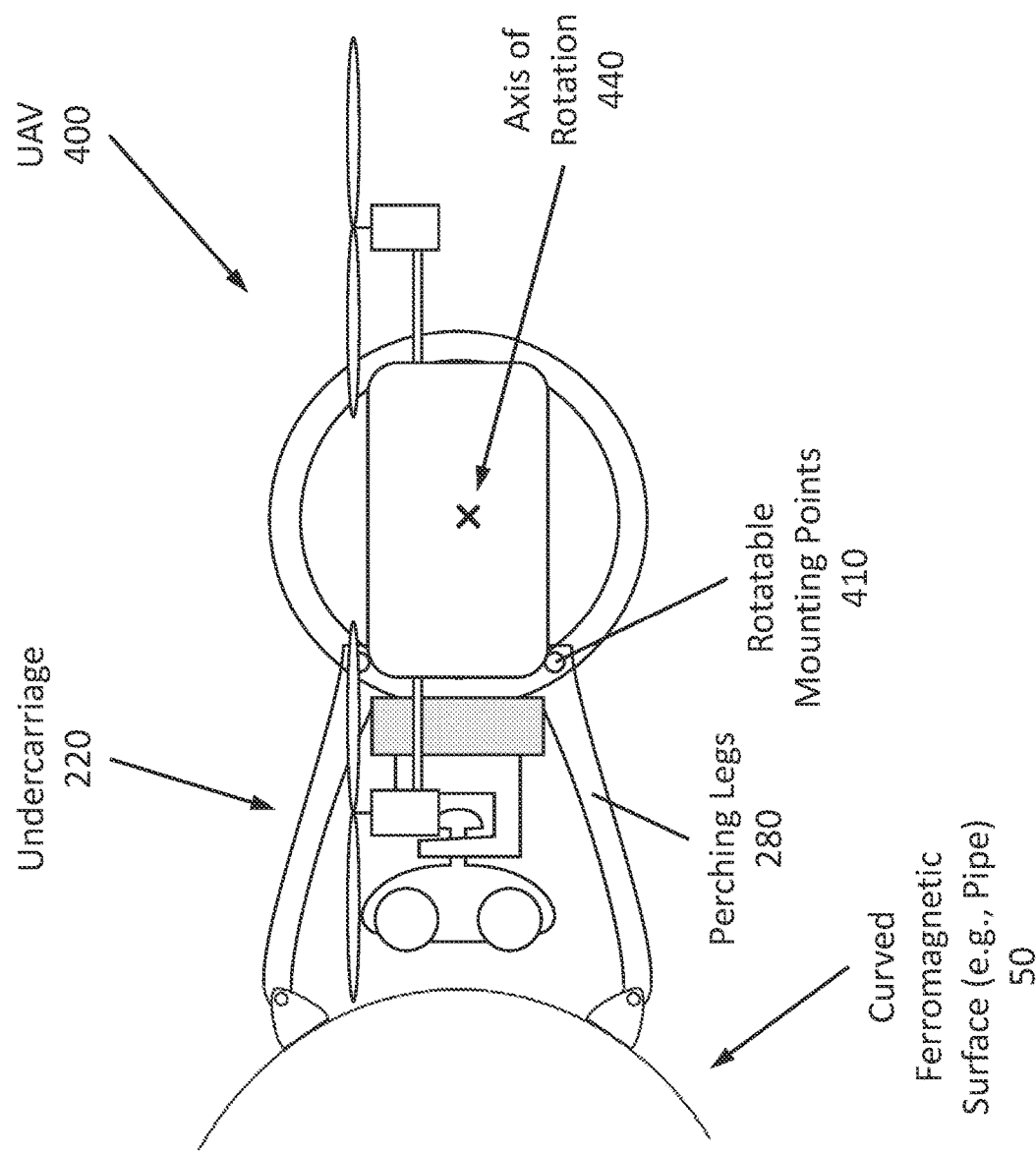

It should also be pointed out that changing the location of the undercarriage 220 does change the center of mass for the UAV 300. As such, the UAV 300 has to compensate for this change. In some embodiments, an onboard flight controller for the UAV 300 is configured (e.g., by logic, code, or the like) to keep the UAV 300 in a stable hover regardless of weight distribution. For example, if the UAV 300 becomes forward-heavy, then the controller is configured to sense the slightest tilt and compensate for that by increasing the thrust or rotation speeds (of the rotors) on the heavy side to keep the UAV 300 level and stable. In some embodiments (such as illustrated in FIGS. 4A to 4C), to reduce the effect of a changing center of mass, heavy components such as batteries are placed on a rotating rail in opposition to the undercarriage 220. This makes it easier for the flight controller to keep the UAV 200 stable during situations where the undercarriage 220 is not directly below the UAV 200.

FIGS. 4A, 4B, and 4C are profile views of an example UAV 400 having rotatable mounting points 410 as part of rotatable attachment platform 420 for attaching the undercarriage 220 of FIGS. 2A through 3C, together with the attached undercarriage 220 at bottom, top, and side orientations, respectively, with respect to the UAV 400, according to an embodiment. In some embodiments, the UAV 400 includes a motor 430 or actuator for rotating the attachment platform 420 and mounting points 410 about an axis of rotation 440 to a suitable orientation, including during flight (e.g., dynamic rotation). In some other embodiments, the mounting points 410 can be manually rotated to a desired orientation prior to a mission (e.g., static rotation).

In an example motorized embodiment, the motorized system (e.g., motorized attachment platform 420 including mounting points 410 and motor 430 to rotate the mounting points 410 circumferentially about the UAV 400) allows an operator to change the orientation of the undercarriage 220 (payload) with a press of a button. In another embodiment, the UAV 400 automatically changes the orientation of the undercarriage 220 (e.g., during flight) depending on factors such as the observed or otherwise known obstacles around the pipe 50. With these in mind, FIGS. 4A, 4B, and 4C illustrate how the motorized system changes orientation of the perching legs 280 about the axis of rotation 440 to land on the top, bottom, or side, respectively, of the pipe 50.

For example, in one embodiment, the UAV has a controller configured (such as by computer code) to plan which is the safest spot on the pipe 50 on which to perch, such as top, side, or bottom of the pipe 50, or somewhere in between. In the example motorized embodiment shown in FIGS. 4A through 4C, the rotation is achieved through a circular rail around the UAV's body 400. As such, to maintain a reasonable center of mass during rotation, heavy components such as batteries can be placed on the rail (e.g., at opposing positions to the mounting points 410) to serve as counter weights.

In an example user-adjustable (e.g., manual) embodiment, the rotation of the undercarriage 220 is manually adjusted by the user instead of being motorized. For instance, this can be done to save weight, complexity, power, or the like. An example technique for accomplishing this manual adjustment is by releasing hand screws to unlock manual rotation of undercarriage 220 about the circular rail, which can then be relocked once the undercarriage 220 is in the desired position.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV) comprising:
    a body having a control and guidance circuit and one or more propulsors for flying;
    three or more legs connected to the body and configured to land and perch the flying UAV on a curved ferromagnetic surface, each leg including:
        a first portion connected to the body;
        a second portion comprising a magnet and configured to magnetically attach the leg to the ferromagnetic surface during the landing and to maintain the magnetic attachment of the leg to the ferromagnetic surface during the perching; and
        a passive articulation joint connecting the first portion to the second portion and configured to passively articulate the second portion with respect to the first portion in response to the second portion approaching the ferromagnetic surface during the landing; and
    a releasable crawler comprising magnetic wheels configured to:
        detach the crawler from the body during the perching; and
        maneuver the crawler on the ferromagnetic surface while magnetically attaching the crawler to the ferromagnetic surface after the detaching.

2. The UAV of claim 1, wherein the crawler further comprises a probe or tool configured to inspect or maintain the ferromagnetic surface during the maneuvering.

3. The UAV of claim 1, wherein the crawler further comprises a wireless communication circuit configured to communicate wirelessly with the UAV or a base station.

4. The UAV of claim 1, wherein the magnetic wheels are further configured to re-dock the crawler with the body after the maneuvering.

5. The UAV of claim 1, wherein each magnet comprises a permanent magnet.

6. The UAV of claim 5, wherein each magnet comprises a switchable permanent magnet.

7. The UAV of claim 6, wherein each magnet comprises an electro-permanent magnet.

8. The UAV of claim 5, wherein the UAV is configured to apply leverage to the second portion of one or more of the legs magnetically attached to the ferromagnetic surface in order to break the magnetic attachment of the one or more of the magnetically attached legs from the ferromagnetic surface during takeoff of the perched UAV from the ferromagnetic surface.

9. The UAV of claim 1, further comprising a laser scanner connected to the body and configured to provide sensing data to orient the UAV during the landing.

10. The UAV of claim 1, wherein the magnetic wheels comprise four magnetic wheels, and the crawler further comprises two motors each configured to drive two of the four magnetic wheels.

11. The UAV of claim 1, wherein the magnetic wheels comprise omniwheels or Mecanum wheels.

12. An unmanned aerial vehicle (UAV) comprising:
a first body having a control and guidance circuit and one or more propulsors for flying, and further having a plurality of first attachment points; and
an undercarriage comprising:
a second body having a corresponding plurality of second attachment points and mounted to the first body at corresponding pairs of the first and second attachment points;
three or more legs connected to the second body and configured to land and perch the flying UAV on a curved ferromagnetic surface, each leg including:
a first portion connected to the second body;
a second portion comprising a magnet and configured to magnetically attach the leg to the ferromagnetic surface during the landing and to maintain the magnetic attachment of the leg to the ferromagnetic surface during the perching; and
a passive articulation joint connecting the first portion to the second portion and configured to passively articulate the second portion with respect to the first portion in response to the second portion approaching the ferromagnetic surface during the landing; and
a releasable crawler comprising magnetic wheels configured to:
detach the crawler from the second body during the perching; and
maneuver the crawler on the ferromagnetic surface while magnetically attaching the crawler to the ferromagnetic surface after the detaching.

13. The UAV of claim 12, wherein the crawler further comprises a probe or tool configured to inspect or maintain the ferromagnetic surface during the maneuvering.

14. The UAV of claim 12, wherein the crawler further comprises a wireless communication circuit configured to communicate wirelessly with the UAV or a base station.

15. The UAV of claim 12, wherein the magnetic wheels are further configured to re-dock the crawler with the second body after the maneuvering.

16. The UAV of claim 12, wherein each magnet comprises a permanent magnet.

17. The UAV of claim 16, wherein each magnet comprises a switchable permanent magnet.

18. The UAV of claim 17, wherein each magnet comprises an electro-permanent magnet.

19. The UAV of claim 16, wherein the UAV is configured to apply leverage to the second portion of one or more of the legs magnetically attached to the ferromagnetic surface in order to break the magnetic attachment of the one or more of the magnetically attached legs from the ferromagnetic surface during takeoff of the perched UAV from the ferromagnetic surface.

20. The UAV of claim 12, further comprising a laser scanner connected to the first body and configured to provide sensing data to orient the UAV during the landing.

21. The UAV of claim 12, wherein the magnetic wheels comprise four magnetic wheels, and the crawler further comprises two motors each configured to drive two of the four magnetic wheels.

22. The UAV of claim 12, wherein the magnetic wheels comprise omniwheels or Mecanum wheels.

23. The UAV of claim 12, wherein the undercarriage further comprises:
a docking port that connects to and secures the crawler to the second body during the flying; and
wherein the UAV is configured to connect to and adjust the height of the docking port and secured crawler with respect to the ferromagnetic surface during the perching.

24. The UAV of claim 12, wherein:
the first body further has a corresponding plurality of third attachment points; and
the second body is configured to detach from the first body at the first attachment points and to mount to the first body at corresponding pairs of the third and second attachment points.

25. The UAV of claim 12, wherein the first body comprises a movable attachment platform having the first attachment points and configured to move the first attachment points relative to a remainder of the first body.

26. The UAV of claim 25, further comprising a motor configured to move the attachment platform during the flying.

27. The UAV of claim 25, wherein the movable attachment platform is further configured to rotate the first attachment points about an axis of the first body.

* * * * *